United States Patent
Selfridge et al.

(10) Patent No.: US 11,314,942 B1
(45) Date of Patent: *Apr. 26, 2022

(54) ACCELERATING AGENT PERFORMANCE IN A NATURAL LANGUAGE PROCESSING SYSTEM

(71) Applicant: Interactions LLC, Franklin, MA (US)

(72) Inventors: Ethan Selfridge, Jersey City, NJ (US); Michael Johnston, New York, NY (US); Robert Lifgren, Port Washington, NY (US); James Dreher, Carmel, IN (US); John Leonard, Avon, IN (US)

(73) Assignee: Interactions LLC, Franklin, MA (US)

( * ) Notice: Subject to any disclaimer, the term of this patent is extended or adjusted under 35 U.S.C. 154(b) by 112 days.

This patent is subject to a terminal disclaimer.

(21) Appl. No.: 16/825,856

(22) Filed: Mar. 20, 2020

Related U.S. Application Data

(63) Continuation of application No. 15/963,915, filed on Apr. 26, 2018, now Pat. No. 10,621,282, which is a
(Continued)

(51) Int. Cl.
*G10L 15/22* (2006.01)
*G06F 40/30* (2020.01)
(Continued)

(52) U.S. Cl.
CPC ............ *G06F 40/30* (2020.01); *G06F 40/56* (2020.01); *G10L 15/183* (2013.01);
(Continued)

(58) Field of Classification Search
CPC ...................................................... G10L 15/22
See application file for complete search history.

(56) References Cited

U.S. PATENT DOCUMENTS

| 5,712,957 A | 1/1998 | Waibel et al. |
| 5,855,000 A | 12/1998 | Waibel et al. |
| (Continued) | | |

OTHER PUBLICATIONS

Ogata, J. et al., "Speech Repair: Quick Error Correction Just by Using Selection Operation for Speech Input Interfaces," Interspeech, 2005, pp. 1-4.

(Continued)

*Primary Examiner* — Jialong He
(74) *Attorney, Agent, or Firm* — Fenwick & West LLP

(57) ABSTRACT

A computer-implemented method for providing agent assisted transcriptions of user utterances. A user utterance is received in response to a prompt provided to the user at a remote client device. An automatic transcription is generated from the utterance using a language model based upon an application or context, and presented to a human agent. The agent reviews the transcription and may replace at least a portion of the transcription with a corrected transcription. As the agent inputs the corrected transcription, accelerants are presented to the user comprising suggested texted to be inputted. The accelerants may be determined based upon an agent input, an application or context of the transcription, the portion of the transcription being replaced, or any combination thereof. In some cases, the user provides textual input, to which the agent transcribes an intent associated with the input with the aid of one or more accelerants.

20 Claims, 9 Drawing Sheets

Related U.S. Application Data continuation of application No. 15/796,511, filed on Oct. 27, 2017, now abandoned.

(51) Int. Cl.

| | | |
|---|---|---|
| *G06F 40/56* | (2020.01) | |
| *G10L 15/26* | (2006.01) | |
| *G10L 15/18* | (2013.01) | |
| *G10L 15/183* | (2013.01) | |

(52) U.S. Cl.
CPC ...... *G10L 15/1815* (2013.01); *G10L 15/1822* (2013.01); *G10L 15/22* (2013.01); *G10L 15/26* (2013.01)

(56) References Cited

U.S. PATENT DOCUMENTS

| | | | |
|---|---|---|---|
| 7,660,715 B1 * | 2/2010 | Thambiratnam | G10L 15/22 704/244 |
| 2002/0123894 A1 | 9/2002 | Woodward | |
| 2002/0138265 A1 | 9/2002 | Stevens et al. | |
| 2005/0033574 A1 | 2/2005 | Kim et al. | |
| 2006/0149551 A1 | 7/2006 | Ganong et al. | |
| 2006/0293889 A1 | 12/2006 | Kiss et al. | |
| 2007/0038449 A1 | 2/2007 | Coifman | |
| 2007/0100635 A1 | 5/2007 | Mahajan et al. | |
| 2007/0208567 A1 | 9/2007 | Amento et al. | |
| 2008/0077406 A1 | 3/2008 | Ganong | |
| 2008/0126091 A1 | 5/2008 | Clark et al. | |
| 2008/0126100 A1 | 5/2008 | Grost et al. | |
| 2008/0243507 A1 | 10/2008 | Gopinath et al. | |
| 2009/0228273 A1 | 9/2009 | Wang et al. | |
| 2010/0031143 A1 | 2/2010 | Rao et al. | |
| 2010/0125458 A1 | 5/2010 | Franco et al. | |
| 2011/0145224 A1 | 6/2011 | Bangalore | |
| 2011/0153324 A1 | 6/2011 | Ballinger et al. | |
| 2011/0166851 A1 | 7/2011 | LeBeau et al. | |
| 2012/0253823 A1 * | 10/2012 | Schalk | G08G 1/096877 704/270.1 |
| 2012/0323557 A1 | 12/2012 | Koll et al. | |
| 2014/0112460 A1 * | 4/2014 | Cloran | H04M 3/493 379/88.01 |
| 2014/0163981 A1 | 6/2014 | Cook et al. | |
| 2014/0297267 A1 * | 10/2014 | Spencer | G06F 40/274 704/9 |
| 2014/0365226 A1 | 12/2014 | Sinha | |
| 2016/0104482 A1 * | 4/2016 | Aleksic | G10L 19/00 704/235 |

OTHER PUBLICATIONS

United States Office Action, U.S. Appl. No. 15/963,915, dated Aug. 23, 2019, 14 pages.

* cited by examiner

ACCELERATING AGENT PERFORMANCE IN A NATURAL LANGUAGE PROCESSING SYSTEM

CROSS REFERENCE TO RELATED APPLICATIONS

This application is a continuation of co-pending U.S. application Ser. No. 15/963,915, filed on Apr. 26, 2018, which is a continuation of U.S. application Ser. No. 15/796,511, filed on Oct. 27, 2017, both of which are hereby incorporated by reference in their entirety.

FIELD OF ART

The present invention generally relates to the field of natural language processing, and more specifically, to automated and human-assisted transcription of natural language utterances.

BACKGROUND

Many online systems allow for user interaction through natural language input (e.g., spoken word). For example, an online system may query a user for information, to which the user may respond using natural language, which may be transcribed into text that may be parsed by the online system to determine a response. However, automatic speech recognition and transcription software may not always be able to accurately transcribe spoken utterances received from users. Human analysts may be used to supplement automatic transcriptions of spoken utterances, but may not always be able to perform transcriptions quickly enough such that the online system can respond to the user in real time.

SUMMARY

Embodiments facilitate agent-assisted transcription of user utterances. An application may interact with a user at a remote client device by issuing prompts to the user and receiving in response one or more user utterances. Based upon the application and/or a context of the interaction, a language model is selected for producing an automatic transcription of the utterances. In some embodiments, the language model may be dynamically modified or generated based upon additional information, such as information known about the user. The automatic transcription is transmitted to a device of an agent for display to the agent, possibly in real-time as the user is speaking. The agent reviews the received transcription(s), and may replace one or more portions of the transcription with a corrected transcription. As the agent inputs portions of the corrected transcription, a language processing system generates and displays to the agent text predictions that the agent can use or ignore. The text predictions may be determined based upon an agent input, an application or context of the transcription, the portion of the transcription being replaced, the automatic transcription, or any combination thereof. The number of text predictions is not limited and the agent may navigate through different options. The selection of a particular text prediction could influence successive predictions In some embodiments, a computer-implemented method comprises providing, to a user at a client device, a prompt, wherein the prompt is associated with an application and is provided to the user as part of a conversation between the user and the application. The method further comprises receiving, from the client device, an utterance from the user in response to the provided prompt, and identifying a context associated with the provided prompt. The method selects a language model from a plurality of stored language models. For example, in response to a determination that the plurality of stored language models comprises a context-specific language model corresponding to the identified context, the context-specific language model is selected. In response to a determination that the plurality of stored language models comprises an application-specific language model corresponding to the application, the application-specific language model is selected. A default language model is selected in response to a determination that the plurality of stored language models comprises neither the context-specific nor the application-specific language models. The method further comprises generating an automatic transcription of the received utterance using the selected language model, and presenting the automatic transcription to an agent via a user interface.

In some embodiments, a computer-implemented method comprises providing, over a network, a prompt to a user at a remote client device, wherein the prompt is associated with a context of an application at an application server, and is provided to the user as part of a series of interactions between the user at the remote client device and the application at the application server. The method further comprises receiving at the application, from the remote client device over the network, an utterance from the user in response to the provided prompt. An automatic transcription of the received utterance is generated using a language model, the language model selected based upon the context, and provided over the network to a device of an agent for presentation to the agent via a user interface. The method further comprises receiving, from the agent via the user interface, an indication indicating replacement of a portion of the automatic transcription. The method further comprises identifying one or more suggestions for replacing the portion of the automatic transcription, based upon the received indication and the identified context, generating and providing for display to the agent via the user interface, the one or more suggestions, and generating an updated transcription of the utterance based upon the automatic transcription, the indication, and a selected one of the one or more suggestions.

The figures depict embodiments of the present invention for purposes of illustration only. One skilled in the art will readily recognize from the following description that alternative embodiments of the structures and methods illustrated herein may be employed without departing from the principles of the invention described herein.

DETAILED DESCRIPTION

Figure 1:
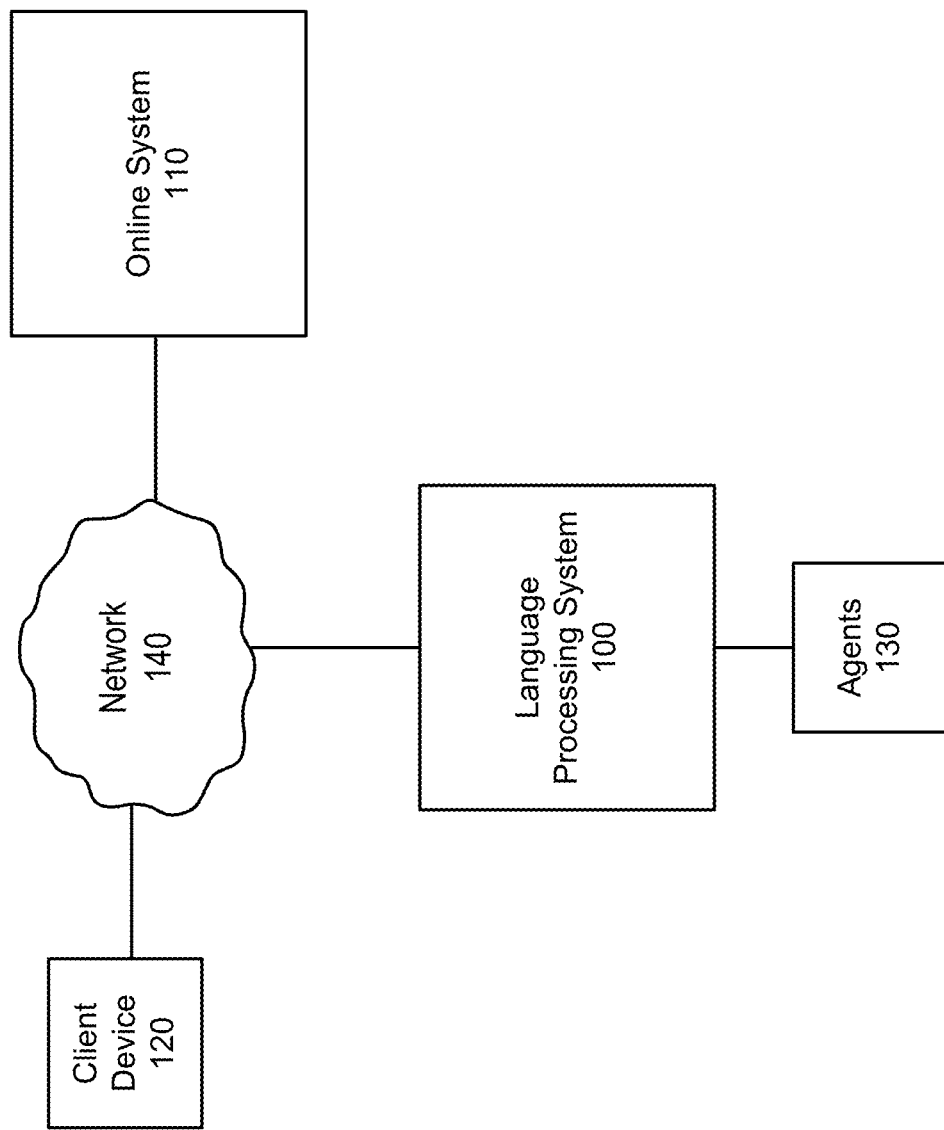
FIG. 1 illustrates a high-level block diagram of a computing environment in which users interact with a computer system using natural language, according to one embodiment.

FIG. 1 illustrates a high-level block diagram of a computing environment in which users interact with a computer system using natural language, according to one embodiment. A client device 120 communicates user utterances to an online system 110 over a network 140. A language processing system 100, being also connected to the network 140, provides natural language interpretation services on behalf of the online system 110 and the client device 120. For example, the language processing system 100 may transcribe and/or interpret the user utterances such that the online system 110 can determine an appropriate response and provide rational feedback to the client device 120. These various components are now described in additional detail.

The client device 120 is a computing device such as a smart phone, laptop computer, desktop computer, or any other device that can receive user utterance in a natural language form, such as text or voice input. The client device 120 communicates the utterance over the network 140 to the online system 110. In some embodiments, the utterance is transmitted to the language processing system 100 for transcription and/or analysis before being received by the online system 110. In other embodiments, the online system 110 receives and forwards the utterance to the language processing system 100 for transcription and/or analysis.

The network 140 may be any suitable communications network for data transmission. In an embodiment such as that illustrated in FIG. 1, the network 140 uses standard communications technologies and/or protocols and can include the Internet. In another embodiment, the entities use custom and/or dedicated data communications technologies.

The online system 110 may correspond to any type of online system that is able to interact with users through the network 140. The online system 110 may be associated with or be maintained by a particular entity that users may interact with, such as a merchant entity, a technical support hotline, and/or the like. In some embodiments, the online system 110 interacts with the user at the client device 120 by providing one or more prompts to the user. The prompts may be presented to the user as text or as audio, and may request particular types of information from the user. The online system 110 receives the user's response (e.g., through the language processing system 100) and determines an appropriate response (e.g., providing additional prompts or feedback to the user, performing one or more actions requested by the user, and/or the like). In some embodiments, the online system 110 may be referred to as an "application."

Upon receipt of an utterance, the natural language processing system 100 transcribes and/or analyzes the utterance such that the utterance may be more easily processed by the online system 110. In some embodiments, the language processing system 100 transcribes the utterance using automatic speech recognition (ASR) software to produce an automatic transcription.

However, the language processing system 100 may not be able to always accurately transcribe utterances by users of the client device 120 using ASR software. For example, the ASR software may be unable to transcribe a particular utterance, or may transcribe the utterance incorrectly. In some embodiments, the language processing system 100, in order to improve the accuracy of transcribed utterances, leverages the ability of human agents to review the utterances by users at the client device 120 and the automated utterance transcriptions produced through ASR, e.g., when ASR indicates low confidence in its interpretation of a given utterance.

Agents 130 correspond to human agents whose abilities are used to supplement the language processing system's 100 ability to provide transcriptions for user utterances. The agents 130 may comprise multiple human agents operating from different locations that are able to access and communicate with the language processing system 100. In some embodiments, the agents 130 are located in different geographic areas or time zones, in order to provide 24/7 support for the language processing system 100.

The agents 130 may access the language processing system 100 through any type of computer device (e.g., personal computers, laptops, workstations, mobile phones . . . etc.). Although FIG. 1 illustrates the agents 130 as accessing the language processing system 100 through a direct connection, it is understood that in other embodiments, the agents 130 can access the language processing system 100 through a network (e.g., the network 140).

In some embodiments, the language processing system 100 generates automatic transcriptions of user utterances and presents the generated transcriptions and the corresponding utterance audio to the agent 130 through a user interface. The agent 130 listens to the utterance and confirms at least a portion of the automatic transcription or inputs a new transcription for the utterance. In some embodiments, the language processing system 100 is configured to have each user utterance reviewed by the agent 130. In some embodiments, the language processing system 100 is configured such that only a portion of user utterances are reviewed by the agent 130. For example, the language processing system 100 may submit a random sampling of utterances for review by the agent 130, or utterances that meet one or more predetermined criteria (e.g., utterances having corresponding automatic transcriptions having a confidence value of below a threshold amount).

In some embodiments, the language processing system 100 is configured to be able to provide transcriptions to user utterances (e.g., using automatic speech recognition, agent support, or a combination thereof) to the online system 110 for processing substantially close to real-time. For example, the language processing system 100 is able to provide transcriptions of user utterances to the online system 110 at a rate that allows the online system 110 to respond to the user utterance (e.g., transmit additional prompts to the user) at a rate that approximates a rate at which the user may hold a normal conversation with a human being. As such, it is important for the language processing system 100 and the agents 130 to be able to quickly transcribe received utterances. In some embodiments, transcription speed may be improved by improving the speed and accuracy at which the language processing system 100 is able to automatically transcribe utterances.

In some embodiments, transcription speed may be improved by providing the agents 130 with text predictions (sometimes referred to as accelerants) to allow the agents 130 to review utterances and automatic transcriptions more quickly. For example, the speed at which an agent is able to review utterances and automatic transcriptions may be based upon an amount of actions (e.g., number of keystrokes on a keyboard) needed to be performed by the agent to produce the resulting transcription. When the automatic transcription corresponding to an utterance is correct, it is desirable for the agent to be able to accept the transcription using a minimal number of actions. For example, the agent can accept the entire automatic transcription by pressing a designated key on a keyboard, or accept portions of the automatic transcription by selecting specific words of the automated transcription (e.g., using left and right arrow keys or tab and shift+tab) and accepting the selected words. In some embodiments, the number of actions that need to be taken by the agent may be reduced by providing accelerants to the agent as the agent transcribes a new transcription (e.g., suggesting words or phrases for the transcriptions based on the current input by the agent, potentially reducing a number of actions needed to be taken by the agent).

As used herein, an "utterance" may refer to any auditory language input received from a user of the client device 120. For example, an utterance may comprise a recording of words or phrases spoken by a user of the client device 120 captured through a microphone or other audio capture device. In addition, a plurality of interactions (e.g., comprising prompts and utterances) between the user and the online system 110 over a given session may be referred to collectively as a "conversation." For example, in a particular conversation, the online system 110 may provide the user of the client device with a prompt, in response to which the user may respond with an utterance. The online system 110 may respond to the received utterance by presenting the user with additional prompts based upon the utterance (e.g., a follow-up prompt) or by performing an action in response to the utterance.

Language Processing System

Figure 2:
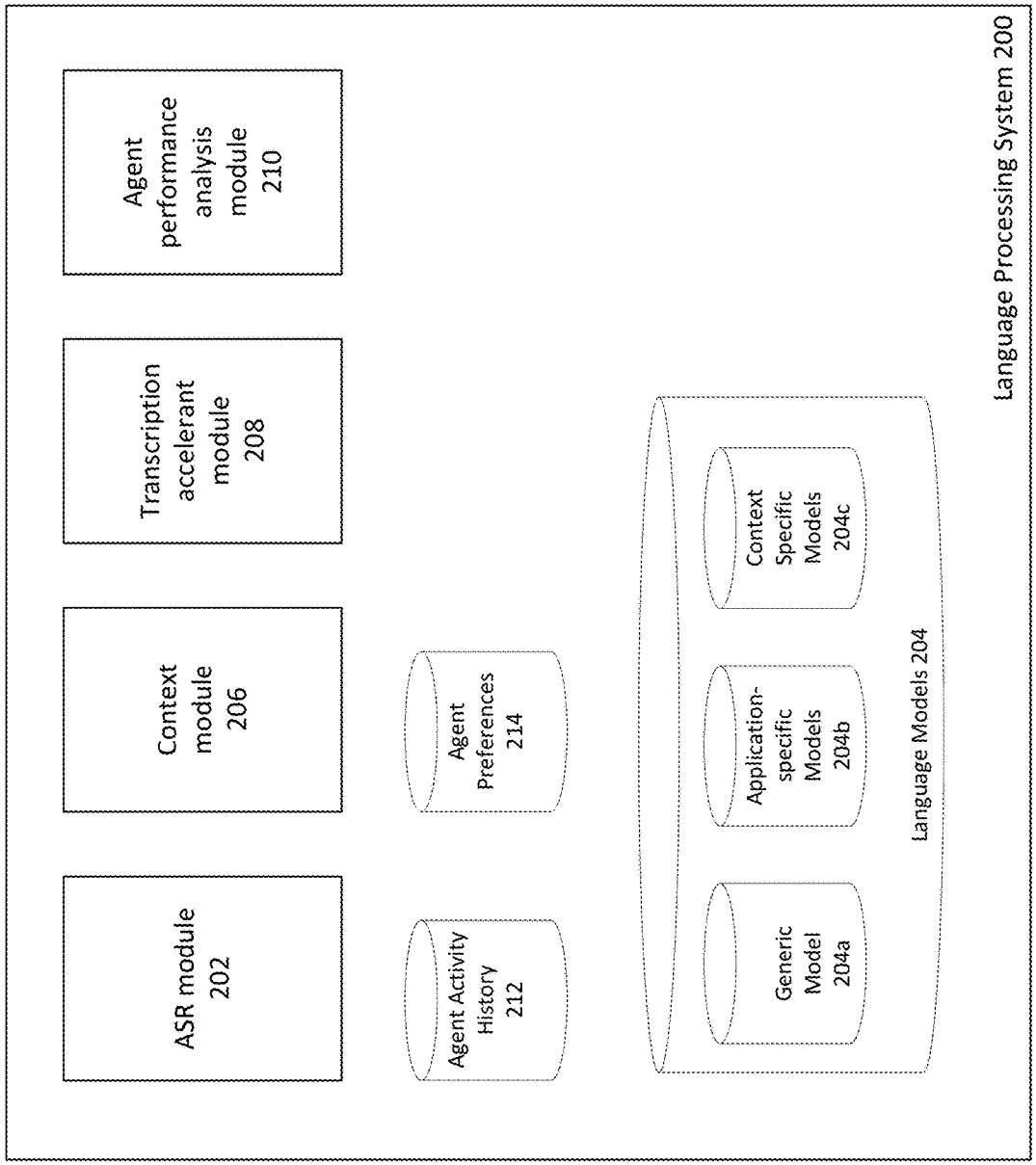
FIG. 2 is a high level block diagram of a language processing system 200, in accordance with some embodiments.

FIG. 2 is a high level block diagram of a language processing system 200, in accordance with some embodiments. The language processing system 200 may correspond to the language processing system 100 illustrated in FIG. 1.

The language processing system 200 comprises an Automatic Speech Recognition (ASR) module 202. The ASR module 202 is configured to receive utterances by users of the online system 110, and to output automatic transcriptions of the received utterances. The user utterances may be received as audio files such as MIDI files or .WAV files, or streamed via some real-time protocol in some arbitrary format/encoding.

In some embodiments, the ASR module 202 is configured to automatically transcribe a received utterance using one or more language models 204. A language model may comprise any type of model that may be used to automatically map portions of received utterances to words or phrases. In some embodiments, the language models 204 may be divided into one or more tiers or categories, which are described in greater detail below. For example, the language models 204 may comprise language models specific to a particular application or conversation context.

The context module 206 is configured to determine a current context of a conversation between a user and an online system (e.g., online system 110). As used herein, a "context" refers to a state of the conversation between the user and online system, and may indicate a determined objective or intent of the online system or the user. As the user interacts with the online system over the course of a conversation, the context of the conversation may change as utterances are received from the user. In some embodiments, the context of the conversation may reflect an intent of the user, a function of the online system 110, or some combination thereof. For example, when the user first initiates a conversation with the online system 110, the context of the conversation may be a "root" or "general purpose" context, as the intent of the user may still be unknown. The online system 110 may present prompts to the user in order to receive an utterance from which an intent of the user may be determined. For example, the user utterance may indicate a reason for the conversation, such as "booking a reservation," "seeking technical support", "troubleshooting a particular product", and/or the like. The indicated intent may be used to establish an initial context for the conversation.

In some embodiments, the online system 110 and language processing system 200 may guide the user in the conversation through a sequence of different conversation contexts. For example, the online system 110 may, in response to the conversation having a certain context, issue certain prompts to the user to change the context of the conversation. For example, upon determining an initial intent of the user, the online system 110 may steer the conversation towards an information gathering context by prompting the user to provide a name, address, account numbers, and/or other personal details. When sufficient information is gathered, the online system 110 may prompt the user towards a different context (e.g., based upon the user's initial intent). As additional information is received from the user over the course of the conversation, the context of the conversation may continue to change. In some embodiments, the context of the conversation may tend to trend from a broader, more general context (e.g., the "root" context) to a narrower, more specific context (e.g., a context associated with a particular issue the user desires assistance in, such as "technical support," "book a reservation," and/or the like).

In some embodiments, the context module 206 accesses a context model in order to track the context of the conversation. In some embodiments, the context model maintains a hierarchy or tree of possible conversation contexts (e.g., starting with a "root" or "general purpose" context, and branching into a plurality of narrower, more specific contexts that may be reached during the conversation based upon received user utterances). For example, the context model may, from an initial "root" context, branch into a plurality of different contexts based upon received user utterances (e.g., "technical support", "booking a reservation", and/or the like), each of which may branch out further as more specific information from the user is obtained.

Although the context model 206 is illustrated as part of the language processing system 200, it is understood that in other embodiments, the context model 206 may be implemented as part of an online system (e.g., the online system 110) separate from the language processing system 200. For example, as the online system 110 interacts with a user (e.g., via the client device 120), the online system 110 may track the current context of the interaction, and issue prompts to the user to steer the interaction towards subsequent contexts (e.g., as defined by a context model). The online system 110 may provide the context information to the language processing system 200, allowing the language processing system 200 to use the received context for ASR (e.g., determining a language model), transcription accelerants, and/or other language processing functions.

In some embodiments, in order to transcribe user utterances, the ASR module 202, as discussed above, accesses one or more language models 204. The language models 204 may comprise a plurality of language models organized into a plurality of different tiers. For example, the language models 204 may comprise a generic or default tier containing a generic or default language model 204a, an application-specific tier containing one or more application-specific models 204b, and a context-specific tier containing one or more context-specific models 204c.

Each language model 204 may be configured to map portions of a received user utterance to specific words or phrases. In some embodiments, user utterances may be expected to contain different types of words or phrases based upon the specific application being accessed. For example, a first application may correspond to an electronics retailer, while a second application may correspond to a travel agency. As such, users having conversations with the first application may be expected to provide utterances having different vocabulary compared to users having conversations with the second application (e.g., an utterance that is part of a conversation with the first application may be more likely contain the word "camera," while an utterance that is part of a conversation with the second application may be more likely to contain the work "Cancun"). In some embodiments, user utterances may also be expected to contain different types of words or phrases based upon a context of the conversation. For example, user utterances in response to a "What is your name?" prompt may be expected to be different from user utterances in response to "Describe your problem" prompt.

Having different tiers of language models allows for the ASR module 202 to select a language model for automatic transcription that is most likely to be able to accurately transcribe the utterance. While the generic language model 204a can map a representation of the user utterance to generic or general-purpose words and phrases, an application-specific model 204b or a context-specific model 204c may be able to more quickly and accurately map this representation to vocabulary that is more specific to the application or context associated with the utterance. For example, a context-specific model used to transcribe utterances in response to a prompt of "What is your name?" may be specifically configured to map extracted portions of the utterance to known names.

In some embodiments, a context-specific model 204c may be specific to a context as used in a specific application. For example, for an application associated with a first hotel chain, a context-specific model 204c specific to a "book a reservation—location" context may access a list of hotel chain locations which may be mapped to the user utterance. On the other hand, a second, different context-specific model 204c may be used for the "book a reservation—location" context for a second application associated with a second hotel chain, wherein the second context-specific model 204c may be associated with a different list of locations associated with the second hotel chain.

In some embodiments, because the ASR module 202 may not always be able to generate accurate transcriptions of received user utterances, the language processing system 200 may leverage the ability of human agents (e.g., agents 130 illustrated in FIG. 1) to review the automatic transcriptions generated using ASR. The language processing system 200 generates a user interface that is presented to the agent, wherein the agent is able to listen to the user utterance and view the automatic transcription. The agent is then able to accept some or all of the automatic transcription as correct, and/or manually input a transcription or portions of a transcription of the user utterance.

In some embodiments, in order to improve the speed at which the agent is able to produce a transcription of the utterance, a transcription accelerant module 208 may be used to provide the agent with one or more text predictions through a user interface. An accelerant may refer to any type of feature that may potentially reduce an amount of time needed by the agent to produce a transcription. For example, an accelerant many allow the agent to produce the transcription of the utterance using fewer actions (e.g., keystrokes on a keyboard) by providing text predictions based upon text already entered by the agent. By analyzing the current input by the agent, the transcription accelerant module 208 may provide the agent with one or more predicted words or phrases through a user interface, which the agent may accept as part of the transcription, without having to type the accepted word or phrase in its entirety. In some embodiments, the transcription accelerant module may also provide accelerants based upon one or more agent preferences 214. Methods and algorithms for providing accelerants that may be used by the agent are described in greater detail below.

The agent performance analysis module 210 is configured to assess the performance of various agents in providing transcription information in response to received utterances. As discussed above, in some embodiments the language processing system 200 is configured to transcribe received user utterances in substantially real-time (e.g., using ASR, agent-assisted transcription, or a combination thereof). As such, agents associated with the language processing system 200 may need to be able to transcribe user utterances with sufficient speed such that transcriptions can be provided to the online system 110 at a rate that allows the online system 110 to respond to the user utterances to simulate a human conversation.

The agent performance analysis module 210 may analyze stored agent activity history 212 to determine the speed at which each of the agents is able to provide transcription information in response to received utterances (e.g., how many seconds on average it takes for a particular agent to provide transcription information for received utterances). In some embodiments, if a particular agent is determined to not meet a threshold level of speed, the agent performance analysis module 210 determines if there are any accelerants being provided by the transcription accelerant module 208 that are not being used by the agent, and that could potentially improve the agent's performance. For example, the agent performance analysis module 210 may determine that the agent, upon being provided the option to use a particular type of accelerant that would result in a correct transcription, does not use the accelerant a threshold percentage of the time. In response, the agent performance analysis module 210 presents a prompt to the agent encouraging the agent to make use of the accelerant in order to improve the agent's transcription performance.

Agent User Interfaces

Figure 3:
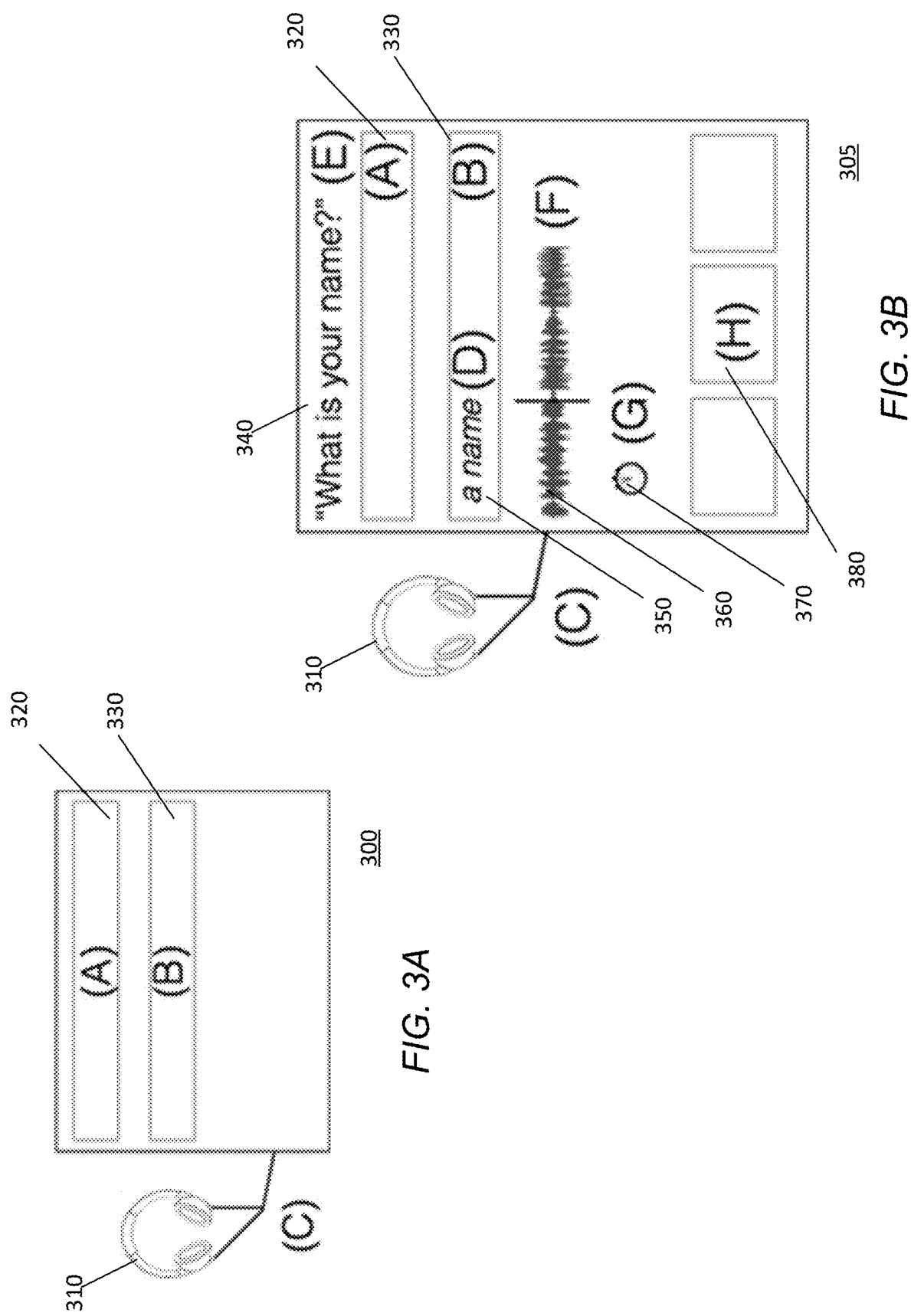
FIGS. 3A and 3B illustrate example user interfaces that may be generated and presented to an agent for transcribing user utterances, in accordance with some embodiments.

FIGS. 3A and 3B illustrate example user interfaces that may be generated and presented to an agent for transcribing user utterances, in accordance with some embodiments. In some embodiments, the user interface 300 provides, to the agent, audio 310 corresponding to a received user utterance. The user interface 300 comprises a first field 320 that displays an automatic transcription of the user utterance (e.g., generated using ASR), and a second field 330 where the agent may modify or input a transcription of the utterance. In some embodiments, the second field 330 displays an editable version of the automatic transcription displayed in the first field 310. The agent listens to the audio 310 and views the transcription displayed in the first field 320, and determines if the transcription is correct. If so, the agent may accept the displayed transcription (e.g., by pressing a button on a keyboard, such as "enter", "tab", or "shift"), without having to type their own transcription or modify the transcription copied in the second field 330.

In some embodiments, if the transcription displayed at the first field 320 (and copied in the second field 330) is partially correct (e.g., some words of the transcription correctly matching those of the utterance, but with other words incorrect or omitted), the agent may accept the portions of the transcription that are correct while typing out the remaining portion of the transcription in the second field 330. For example, the agent may scroll through the words of the automatic transcription displayed in the second field 330 (e.g., using the left and right arrow keys on a keyboard), and replace any words or phrases the agent believes to be incorrect with a corrected transcription. As such, the agent is able to modify any erroneous portion of the transcription while leaving alone portions of the transcription that are correct.

In some embodiments, the automatic transcription displayed in the first field 320 is not automatically copied into the second field 330. Instead, the agent may scroll through the transcription in the first field 320 to identify portions of the transcription the agent believes to be correct, and copy of the selected portions into the second field 320 (e.g., using a predetermined key such as "enter", "tab", or "shift"), such that the agent does not have to manually type the words into the second field 320.

In some embodiments, multiple automatic transcriptions may be displayed in the first field 320. The multiple automatic transcriptions may correspond to possible transcriptions of a received user utterance, each transcription determined by the ASR module 202 to have a confidence exceeding a threshold value. The agent may select a particular transcription as being the correct transcription of the user utterance, or select a particular transcription as being the most accurate, whereupon the selected transcription may be copied into the field 330 for additional modification by the agent.

In some embodiments, the automatic transcription displayed in the first field 320 may comprise different portions displayed with different visual characteristics (e.g., different colors, fonts, and/or the like) indicating a level of confidence associated with each portion of the transcription. This may allow for the agent to easily determine which portions of the transcription may most likely require modification.

FIG. 3B illustrates another example user interface that may be used by an agent to transcribe an utterance, in accordance with some embodiments. In comparison to the user interface 300 illustrated in FIG. 3A, the user interface 305 of FIG. 3B contains additional features that may aid the agent in being able to review a received transcription more quickly. For example, the user interface 305, like the user interface 300, provides the agent with audio 310, the first field 320 displaying the automatic transcription of the utterance, and the second field 330 allowing the agent to input a transcription. In addition, the user interface 305 further displays a prompt 340, corresponding to the prompt that was given to the user to elicit the utterance. In addition, a priming string 350 is displayed that may provide the agent additional context for the utterance. In some embodiments, the priming string 350 is displayed in the second field 330, while in other embodiments, the priming string is displayed in a different part of the user interface 305.

The prompt 340 and the priming string 350 provide the agent with context when transcribing the utterance. In some embodiments, the prompt 340 and priming string 350 inform the agent of what type of utterance to expect. For example, as illustrated in FIG. 3B, the prompt 340 of "What is your name?" and priming string 350 of "a name" inform the agent that the received utterance will most likely correspond to a name, aiding the agent to more accurately transcribe the utterance than would be feasible if the agent had no prior knowledge of what type of words the utterance may contain.

The user interface 305 may further display data pertaining to the audio 310. For example, in some embodiments, the user interface 305 displays a visual representation 360 of the audio 310. In addition, when the agent listens to the audio 310, a timer 370 may indicate an amount of time played within the audio as the audio 310 is played for the agent.

In some embodiments, the user interface 305 further displays one or more transcription suggestions 380 to the agent. As the agent types words for the transcription (e.g., in the second field 330), a language model may be used to generate one or more suggested words or phrases to the agent. In some embodiments, the agent is able to accept a suggestion 380 by selecting the suggestion and pressing a designated keyboard key. In some embodiments, the user interface 305 displays a plurality of suggestions 380 to the agent, corresponding to the suggestions determined by the language model as most likely corresponding to the word or phrase that the agent is trying to type. Example embodiments of generating suggestions 380 are described in greater detail below.

As such, an agent when using the user interface 305 to input a transcription for a received utterance will have available to them a variety of options for improving the speed at which they are able to input the transcription. For example, the agent may accept all or a portion of an automatic transcription. In some embodiments, the agent may accept portions of the automatic transcription on a word-by-word basis. The agent may also manually type portions of a transcription (e.g., in the second field 330). As the agent types the transcription, the language model is used to automatically generate suggestions based upon words or portions of words that the agent has typed. The agent may select and accept a generated suggestion, potentially improving their transcription speed due to no longer having to type out the entire word or phrase corresponding to the suggestion.

Priming Strings

As discussed above, in some embodiments, an agent transcribing an utterance may be provided with a priming string (e.g., priming string 350 in FIG. 3B). The priming string indicates to the agent what categories or types of words or phrases to expect from the received utterance. In some embodiments, the priming string is generated based upon a prompt that is provided to the user to elicit the utterance. For example, if the prompt provided to the user is "What is your name?", then the priming string may be "a name (e.g. Mary or Ramesh)," indicating that they type of utterance expected by the user will be a name. In some embodiments, the priming string is generated based upon a semantic analysis of the prompt. For example, the prompt may be analyzed to identify one or more nouns indicating an expected type of utterance to be received. In addition, conjunctions such as "or" within the prompt can be identified to determine specific words or phrases expected to be included in the utterance (e.g., the presence of "or" in the prompt "Would you like Option A or Option B" may indicate that either Option A or Option B are expected to be included in the received utterance). In other embodiments, manual mappings are performed to map specific prompts to corresponding priming strings.

In some embodiments, the priming string may also be generated based upon a context of the conversation with the user. For example, if the context of the conversation is "booking a reservation," the priming string may indicate the context to the agent. In some embodiments, both the specific prompt and the current conversation context are used to generate the priming string (e.g., "a name [book reservation]", indicating that a name is sought within the reservation booking context).

Figure 4:
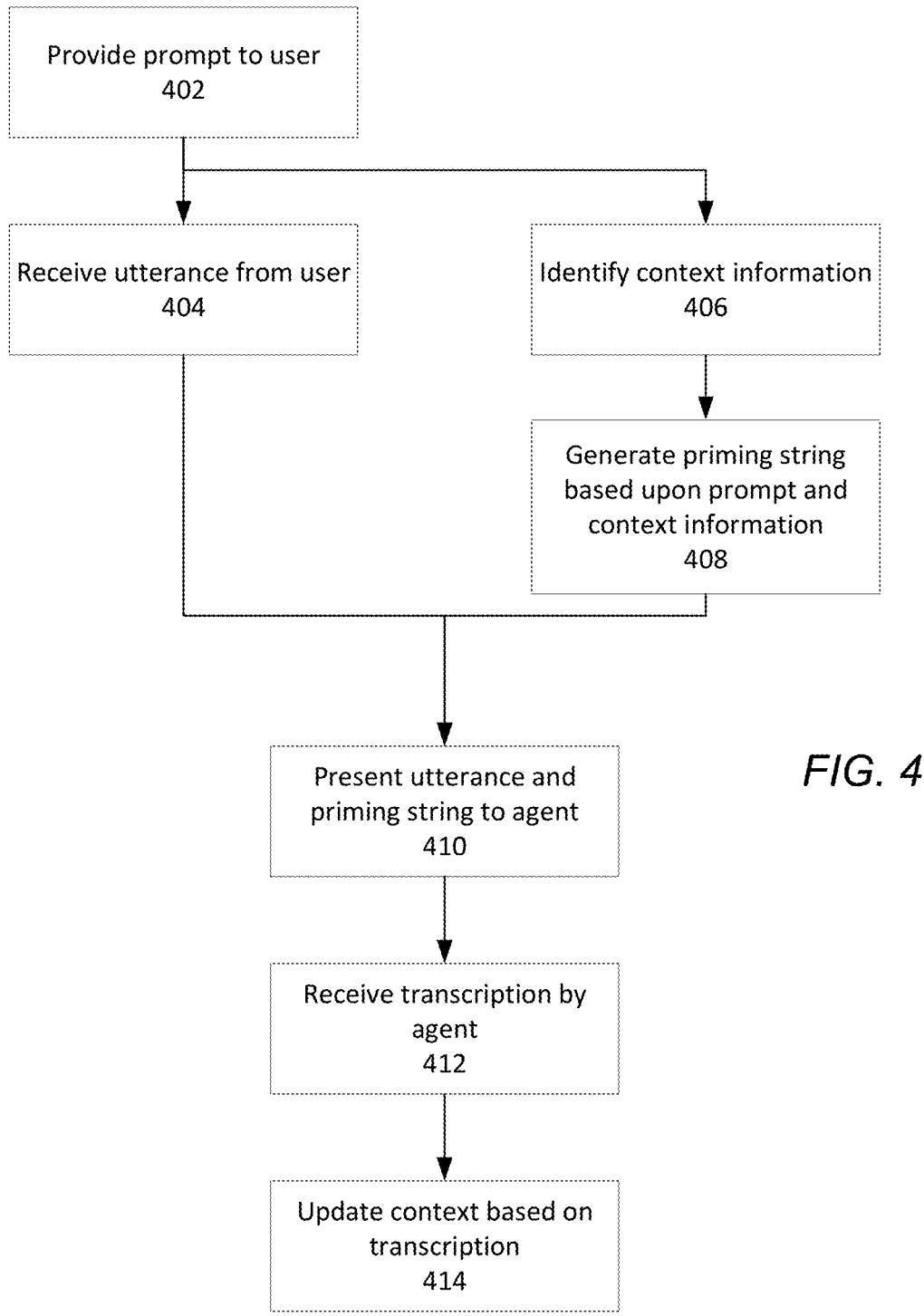
FIG. 4 is a flowchart of an example process for generating a priming string for aiding an agent in transcribing an utterance, in accordance with some embodiments.

FIG. 4 is a flowchart of an example process for generating a priming string for aiding an agent in transcribing an utterance, in accordance with some embodiments. At block 402, the online system provides a prompt to the user as part of a conversation between the user and the online system. The prompt may correspond to text displayed to the user on a client device, or to audio that is played to the user through the client device.

The prompt may request a particular type of response from the user. As such, in some embodiments, the prompt may be mapped to a particular priming string or a portion of a priming string. For example, the prompt "What is your name?" may be mapped to the priming string "a name." In some embodiments, the prompt may present one or more options to the user. As such, the utterance to be received from the user in response to the prompt may be expected to include words or phrases associated with at least one of the presented options. The priming string may indicate words or phrases associated with the presented options. For example, the prompt of "Would you like to select Option A or Option B?" may be mapped to a priming string of "Options_disambig" or "Option A or Option B."

At block 404, an utterance is received from the user in response to the prompt, corresponding to natural language spoken by the user. In some embodiments, the utterance from the user may be received through a microphone or other audio device associated with a client device operated by the user (e.g., a mobile phone), and may be transmitted or stored as an audio file. The utterance may be received directly by the language processing system from the user's client device, or may be forwarded to the language processing system by the online system.

In parallel with receiving the utterance from the user, the language processing system may, at block 406, identify context information associated with a current context of the conversation. In some embodiments, the language processing system maintains the current context of the conversation using a context model. For example, the context model may define a branching model where the current context of the conversation is based upon the content of previous prompts and previously received utterances.

At block 408, the language processing system generates a priming string based upon the prompt and/or the determined context information. For example, the language processing system may supplement a priming string mapped to the prompt with additional information based upon the context. For example, the online system may, over the course of interaction with one or more users, present the same prompt but in different contexts. As such, the priming string presented to the agent for reviewing the transcriptions of utterances received in response to the prompt may be different based upon the context. For example, the prompt "What is your name?" may be provided in a "gathering information for new user" context or a "name verification for existing user" context. As such, the priming string for the prompt in the "gathering information for new user" context may simply be "a name," while the priming string for the prompt in the "name verification for existing user" may be "name verification: <previously stored name>."

At block 410, the language processing system generates a user interface to be displayed to the agent (e.g., the user interface 305 illustrated in FIG. 3B), wherein the user interface presents the received utterance from the user and the generated priming string to the agent. For example, the agent may, using the user interface, listen to the utterance while reading the generating priming string. The generated priming string may provide the agent some context concerning the utterance, potentially improving transcription time for the agent.

At block 412, the language processing system receives a transcription from the agent. The transcription may comprise a transcript manually entered by the agent, at least a portion of an automatic transcript accepted by the agent, or any combination thereof. In some embodiments, the agent may, in addition to providing a transcription of the user's utterance, further supplement the transcription by transcribing an "intent" of the user's utterance or other metadata associated with the user's utterance. For example, if the user's utterance was "my car has a flat tire," the agent may transcribe as the user's intent as "vehicle+broken" and/or "tire+flat." In some embodiments, the agent may mark certain attributes associated with the utterance, such as a name, address, descriptor, etc. included in the received utterance. In some embodiments, the agent may indicate an attribute of the received utterance by selecting one or more attributes or attribute values from a displayed list or other user interface element.

At block 414, the language processing system may update the context of the conversation based upon the received transcription. For example, the language processing system may parse the received transcription to determine a subsequent context of the conversation. In addition, the subsequent context may further be based upon any additional transcriptions of "intent" provided by the agent. In some embodiments, the online system, upon receipt of the transcription from the language processing system, may determine a subsequent prompt or action based upon the parsed transcription.

In some embodiments, machine learning may be used to improve the effectiveness of priming strings. For example, in some embodiments a number of different possible priming strings may be used for a particular prompt and/or context of the conversation. However, not all of the possible priming strings may be equally useful to the agent. In some embodiments, the language processing system may test different variations of priming strings by presenting the different priming strings to agents and recording agent performance. For example, the language processing system may test a variation A and a variation B of a priming string corresponding to a particular prompt and/or context using a training set comprising a plurality of utterances received in response to a prompt/context associated with the priming string. The utterances of the training set may be presented to a plurality of different agents for review and transcription, in conjunction with a particular variation of the priming string. For example, the priming strings "Options_disambig" and "Option A or Option B" may correspond to possible priming strings that may be presented to an agent in conjunction with the prompt "Would you like to select Option A or Option B?" The training set corresponds to a set of utterances received from various users in response being presented with the prompt "Would you like to select Option A or Option B?" over a plurality of different conversations.

By presenting the variations of the priming string in conjunction with corresponding utterances to the plurality of different agents, and recording an amount of time spent by the agents in transcribing the utterances, the effectiveness of the different priming string variations may be assessed. In some embodiments, the recorded transcription times may be modified by a length of time associated with the corresponding utterance to determine a transcription speed for the agents. If the transcription speed of the agents presented with variation A of the priming string compared to those presented with variation B of the priming string differs, then the language processing system may determine a particular variation of the priming string to be more effective, and will use the variation associated with improved agent performance for the particular prompt and/or context in future conversations.

In some embodiments, the user may provide one or more textual inputs instead of or in addition to the provided utterance. The agent may be tasked with transcribing an intent associated with the received user text and/or one or more attributes or descriptors included in the text. The transcribed intent may be used to determine a subsequent context of the conversation. For example, if the received textual input is "My name is Joe," the agent may transcribe the attribute "name=Joe."

Tiered Language Models

Figure 5:
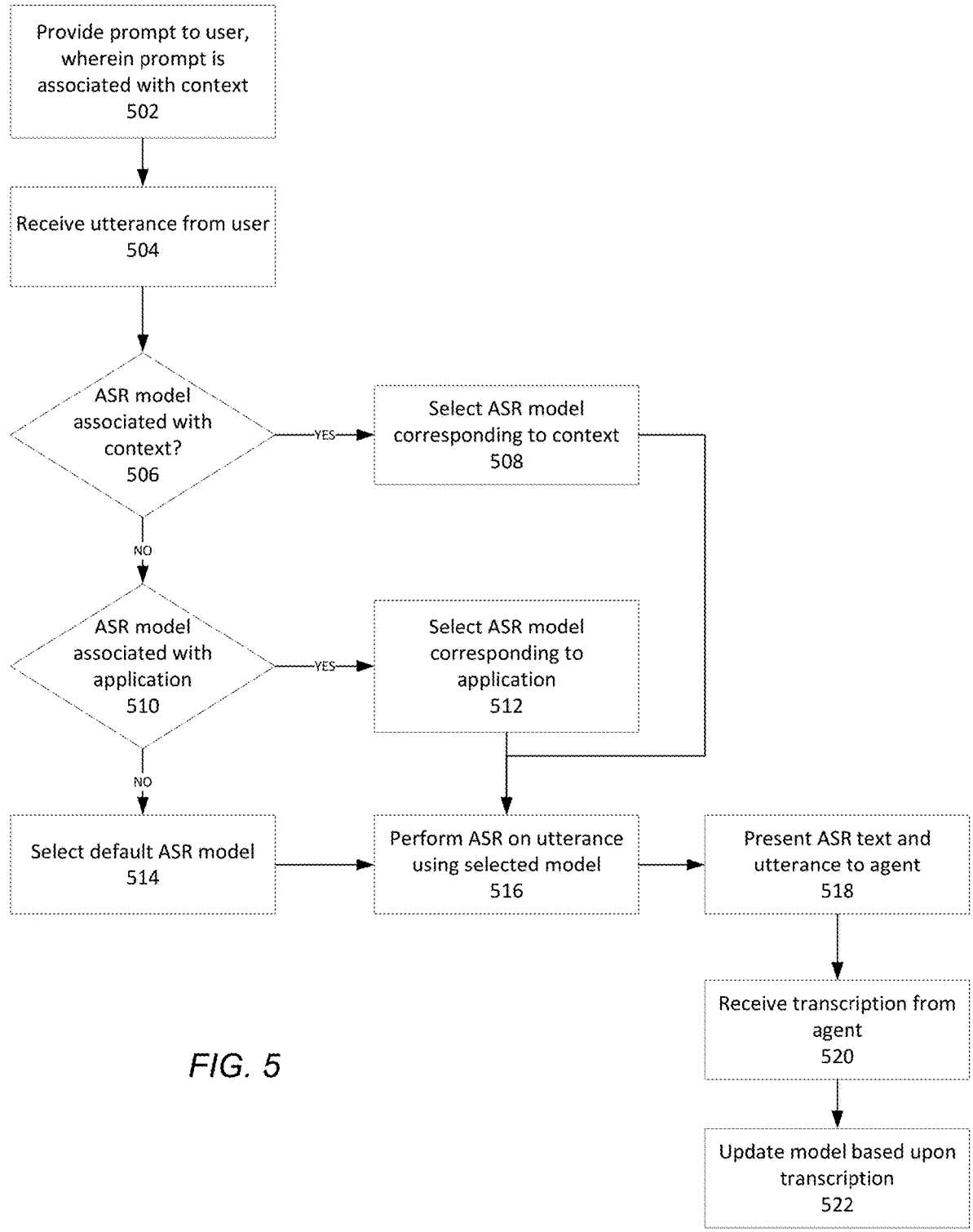
FIG. 5 is a flowchart of an example process for transcribing utterances using tiered language models, in accordance with some embodiments.

FIG. 5 is a flowchart of an example process for transcribing utterances using tiered language models, in accordance with some embodiments. As discussed above, language models may be used by the language processing system to automatically transcribe audio corresponding to a user utterance to text.

The language and vocabulary expected to be used by a user may vary depending based upon the prompt given to the user and/or the context of the conversation. For example, a user presented with the prompt "What is your name?" would be expected to respond using different vocabulary and language than if they were presented with the prompt "Please describe your problem." As such, a language model for a "name" context may be associated with different vocabulary than for a language model for a "general problem description" context. Thus, a plurality of different language models may be maintained for different contexts, in order to increase the speed and accuracy of automatic transcription.

In some embodiments, the plurality of language models maintained by the language processing system may be organized into one or more tiers, each tier corresponding to a different level of specificity. For example, the one or more tiers may comprise, in order of increasing specificity, a generic tier, and application tier, and a context tier. The generic tier is associated with a generic language model (e.g., generic model 204a), while the application tier is associated with a plurality of application-specific language models each corresponding to a more specialized vocabulary set associated with a respective application (e.g., application-specific model 204b). In some embodiments, the context tier is associated with context-specific language models used for specific contexts that may be reached during a conversation between the user and online system (e.g., context-specific model 204c).

At block 502, the language processing system provides a prompt to a user during a conversation. The conversation may be associated with a particular application, and the prompt may be associated with a particular context. At block 504, the language processing system receives an utterance from the user in response to the prompt.

At block 506, the language processing system determines if there is a language model associated with the particular context of the prompt (e.g., a context-specific model). If so, then at block 508, the language processing system selects the context-specific model associated with the context of the prompt. In some embodiments, the context-specific model may be associated with the specific context/application combination of the prompt.

On the other hand, if there is no context-specific model associated with the particular context, then at block 510, the language processing system determines if there is a language model associated with the particular application of the conversation. If so, then at block 512, the language processing system selects the application-specific model associated with the application of the conversation.

On the other hand, if there is no application-specific model associated with the particular application, then at block 514, the language processing system selects a generic or default language model for transcribing the utterance.

In some embodiments, the language processing system may contain additional tiers of language models, such as an utterance-specific tier. For example, the language processing system may dynamically generate a language model based upon a context of the conversation and known information concerning the user from which the utterances are received. If information about a particular user is known (e.g., through previous conversations with the user), a model may be generated or modified based upon the known information. For example, if the user's name is known and the context of the conversation is "name verification," then instead of using a generic name verification language model, a model may be dynamically built or modified from an existing model based upon the known name of the user.

At block 516, the language processing system uses the selected language model to transcribe the utterance to produce an automatic transcription. At block 518, the language processing system presents the automatic transcription and the utterance to an agent. In some embodiments, the language processing system may also present a priming string corresponding to the prompt and/or context to the agent (e.g., as described in FIG. 4).

At block 520, the language processing system receives a transcription of the utterance from the agent. In some embodiments, the agent may accept the automatic transcription presented to them in its entirety. The agent may also accept a portion of the automatic transcription, while manually typing out a different portion of the transcription. At optional block 522, the language processing system updates the selected language model based upon the agent-provided transcription. In some embodiments, the language processing system updates the language model using machine-learning techniques. For example, the language processing system may change how the language model associates certain portions of the utterance with syllables or words, based upon a difference between the automatic and agent-provided transcriptions.

In some embodiments, the language processing system may generate new models based upon newly received transcriptions, interpolate models built using new transcriptions with models built using older transcriptions, or increase the size of the corpus used for generating or maintaining language models. In some embodiments, only a portion of the models may be updated (e.g., based upon a hierarchical structure within the model). In some embodiments, the language processing system may generate one or more auxiliary models that may be used alongside a primary model when generating transcriptions from received utterances, in order score a confidence of the primary model (e.g., if the transcription from the auxiliary model matches that of the primary model), to provide alternate transcriptions for a portion of an utterance (e.g., based on the confidence values of the transcription), and/or the like.

In some embodiments, each of the language models maintained by the language processing system may begin as a generic language model. As each language model is used to perform automatic transcription of utterances associated with its corresponding application and/or context, and is updated based upon agent-provided transcriptions. As such, language models for different applications/contexts will begin to diverge as they are used more frequently, each being trained to more quickly and accurately recognize the specialized vocabulary associated with its respective application/context.

In some embodiments, one or more sets of vocabulary may also be manually associated with a particular language model. An application-specific or context-specific language model may be associated with a vocabulary set corresponding to specific vocabulary expected to be uttered by users interacting with the application. For example, a language model corresponding to a context of "Employee contact—Last name" may be trained using a vocabulary set comprising the last names of employees associated with the application, such that the language model will be able to quickly and accurately transcribe utterances in the context without extensive training.

In some embodiments, certain context-specific models may be associated with a specific context/application combination, while other context-specific models may be associated with only a particular context across multiple different applications. In some embodiments, conversations with different applications may be able to reach common contexts. For example, different applications may have a "name gathering context" where the language processing system prompts the user for a name. Since the vocabulary used by the users in this context is unlikely to change across applications, a common "name gathering context" language model may be used across multiple different applications. On the other hand, if the vocabulary expected to be used by users in expected to change in the same context under different applications, then different language models for each context/application combination may be maintained. In some embodiments, a context-specific model may be associated with multiple contexts or context/application combinations.

In some embodiments, the language processing system may use a hybrid model comprising a combination of two or more different language models. For example, each language model, when used to transcribe an utterance, may also output a confidence value indicating a probability that the transcription matches the utterance. In some embodiments, each phone, word, or groups of phones/words transcribed by the language model may be associated with a confidence value.

In some embodiments, if the language processing system is unable to automatically transcribe a particular portion of a received utterance (e.g., one or more words or syllables of the utterance) using a particular language model with at least a threshold confidence value, the language processing system may attempt to transcribe the portion of the utterance using a more generic language model (e.g., a language model associated with a broader tier). As such, the language processing system may transcribe a first portion of a received utterance using a first model, and a second, different portion of the utterance using a second model. In some embodiments, the language processing system may create a language model dynamically on the fly based upon a set of previously transcribed utterances or portions of utterances (e.g., words, phrases, or sentences). The set of utterances (or portions thereof) may be determined based upon a prompt, context, application, user, and/or some combination thereof associated with the received utterance. In some embodiments, a dynamically created language model may correspond to a modification of an existing language model (e.g., modifying a "names" language model based upon a previously received name associated with a particular user). In some embodiments, where the set of utterances used to dynamically generate a model is relatively small, the model may be generated in an amount of time generally not noticeable to the user (e.g., 10-20 ms).

Accelerating Agent Transcription Using Text-Prediction

In some embodiments, various accelerants may be used in order to improve agent performance. For example, the agent reviewing a transcription of a received utterance may replace portions of the transcription (i.e., a subset of the transcription, or the entire transcription) believed to be incorrect with replacement text. As the agent types replacement text for the transcription, the language processing system may provide accelerants to reduce an amount of time needed for the agent to produce the replacement text for the transcription, such as text prediction corresponding to likely words or phrases that the agent is typing. If the predicted words or phrases match those that the agent is trying to type, the agent may accept the predicted text instead of having the manually type out the complete word or phrase, potentially increasing transcription speed.

Figure 6:
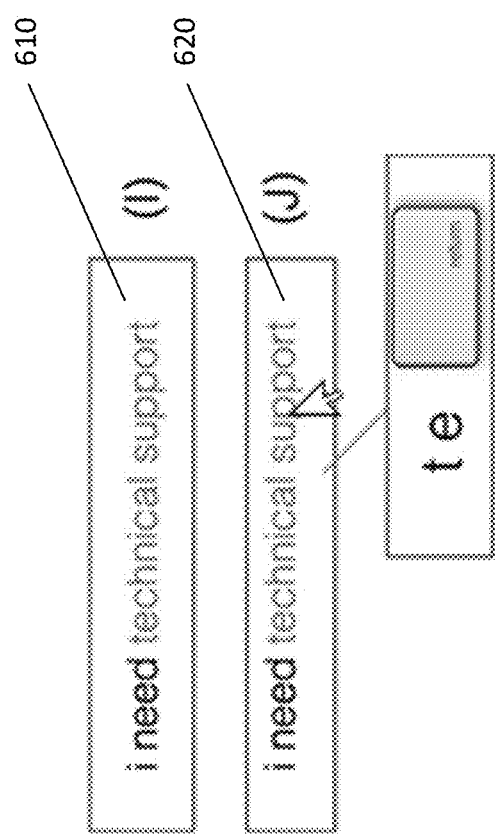
FIG. 6 illustrates an example of text prediction, in accordance with some embodiments.

FIG. 6 illustrates an example of text prediction, in accordance with some embodiments. As illustrated in FIG. 6, the agent may be attempting to transcribe the phrase "I need technical support" 610 in response to a received utterance. The phrase "technical support" would require 17 keystrokes to type manually. However, the online system may, after the agent has typed a certain portion of the phrase (e.g., the first two letters "te"), determine that the agent is likely attempting to type the phrase "technical support." As such, the language processing system may present the phrase "technical support" to the agent as suggested text 620. The agent may accept the suggested text by pressing a designated key (e.g., the "return" key), resulting in the phrase "technical support" being typed using only 3 keystrokes, potentially improving the agent's transcription speed.

On the other hand, if the agent does not actually wish to type the phrase "technical support" (e.g., the agent is actually trying to type the word "technology"), then the agent may continue to type manually without accepting the suggested text 620. In some embodiments, as the agent types additional letters, the language processing system may update the suggested text 620 based upon the most likely word or phrase the agent is trying to type (e.g., as determined using a language model).

Figure 7:
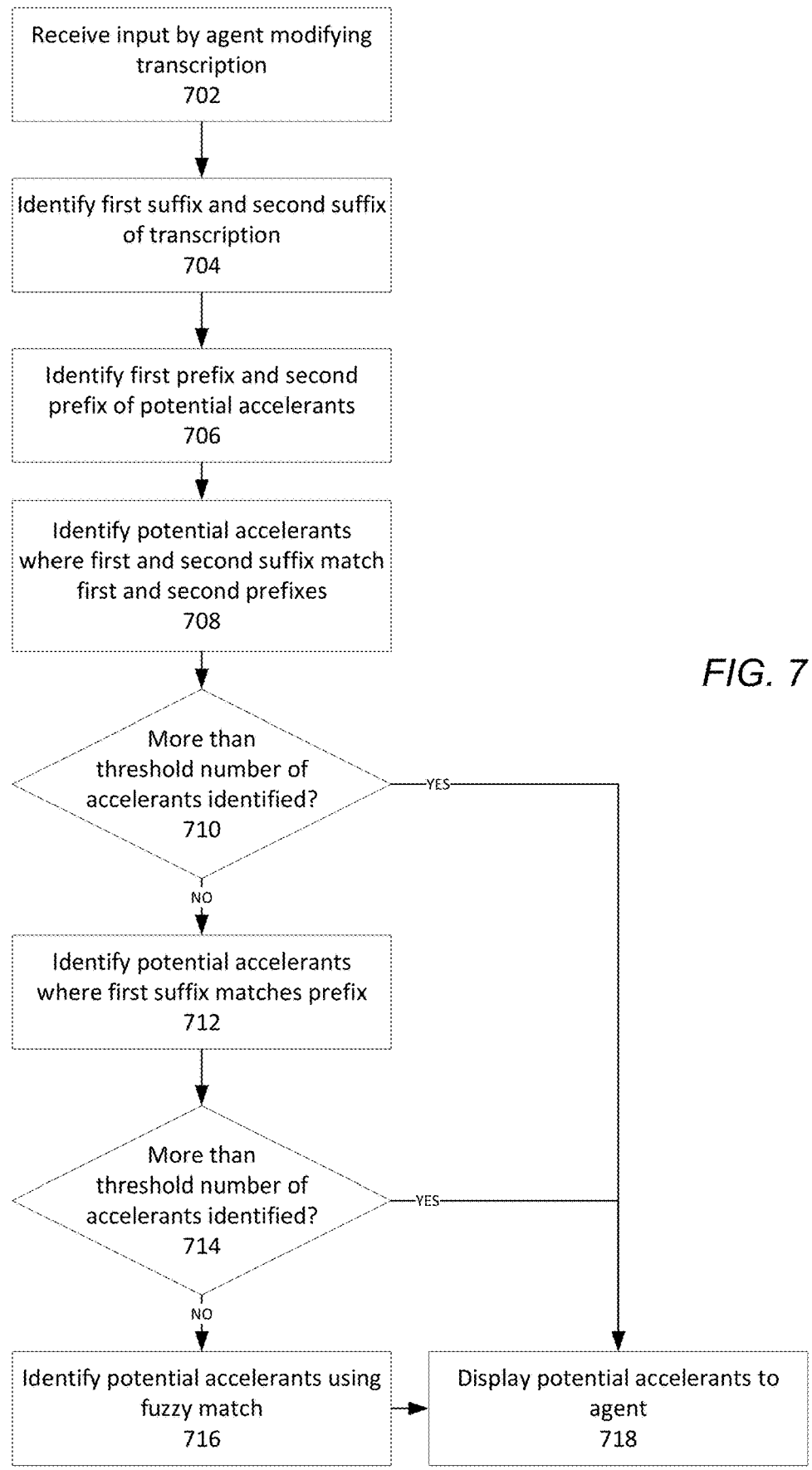
FIG. 7 is a flowchart of an example process for generating automatic predicted text, in accordance with some embodiments.

FIG. 7 is a flowchart of an example process for generating automatic predicted text, in accordance with some embodiments. In some embodiments, the language processing system performs text prediction by matching one or more words or portions of words that have been typed by an agent (also referred to as "suffixes") with pieces of predicted text (also referred to as "accelerants"), which may include generic words or phrases, or specialized vocabulary depending upon the application and/or context associated with the utterance.

At block 702, the language processing system received input by an agent. The input may comprise an indication by the agent that at least a portion of a transcription (e.g., an automatic transcription) is to be replaced. For example, the input may correspond to the agent deleting a portion of the transcription, or one or more letters entered by the agent using a keyboard or other input device. In some embodiments, the input may also comprise an indication of one or more words from an automatic transcription that have been accepted by the agent. In some embodiments, the input by the agent may correspond to a transcription by the agent of an "intent" of a received user input (e.g., a user utterance or textual input).

At block 704, the language processing system identifies one or more suffixes of the transcription (e.g., a first suffix and a second suffix). As used herein, the "first suffix" refers to a last word or portion thereof of the transcription prior to the portion of the transcription to be replaced, or a portion of a current word being typed by the agent. The "second suffix" refers to a word directly preceding the first suffix, which may have been typed by the agent or may have been part of the original transcription presented to the agent. For example, if the input is "I want technical supp" (e.g., where the agent is currently typing "I want technical support"), then the first suffix will be "supp," while the second suffix is "technical." In some embodiments, when the transcription only contains a single word or a portion of a single word prior to the portion being replaced, the transcription may not contain a second suffix.

At block 706, the online system generates a list of one or more potential accelerants, and identifies a first prefix and a second prefix for at least a portion of the one or more potential accelerants. The list of accelerants may comprise a generic list of words of phrases and/or specialized vocabulary based upon the application and/or context of the utterance. For example, if the context for the utterance is "names," the list of potential accelerants identified by the online system may consist entirely of known names in the English language. On the other hand, if the context for the utterance is "problem explanation," then the list of potential accelerants may comprise more generic vocabulary. In some embodiments, the list of potential accelerants may be based upon an application or context-specific language model associated with the user utterance. For example, the language processing system may access a language model based on an application, context, prompt, user, or some combination thereof. In some embodiments, the language model may be the same language used to perform automatic transcription of utterances, or may be a different language model.

Each accelerant comprises one or more words that may potentially correspond to the transcription being inputted by the agent. As used herein, the first and second prefixes correspond respectively to the first and second words of a particular accelerant. For example, for the phrase "technical support," the first prefix would be "technical" while the second prefix would be "support." It is understood that in some embodiments, an accelerant may contain more than two words (e.g., one or more words after the second prefix). Some accelerants may also contain only one word (e.g., only a first prefix, with no second prefix).

At block 708, the language processing system attempts to identify potential accelerants that match the first and second suffixes of the received agent input. For example, the language processing system attempts to identify accelerants where the first suffix matches the second prefix, and second suffix matches and first prefix. In some embodiments, the match must be an exact match. For example, the second suffix of the received input must exactly match the first prefix of the potential accelerant. In addition, because the first suffix of the received input may correspond to only a portion of a word (e.g., the agent has not yet finished inputting the word), the first suffix is considered to exactly match the second prefix if the first n letters of the second prefix exactly match those of the first suffix, wherein n corresponds to the number of letters in the first suffix. For example, the input "technical sup" would match the potential accelerants "technical support" and "technical support agent."

At block 710, the language processing system determines whether at least a threshold number of potential accelerants (e.g., 3) have been identified. If so, the process may proceed to block 718, where the identified potential accelerant are displayed to the agent.

On the other hand, if fewer than the threshold number of potential accelerants have been identified, the language processing system may attempt to identify additional potential accelerants using broader criteria. For example, at block 712, the online system attempts to identify potential accelerants where the first suffix is an exact match with the first prefix of the potential accelerant. For example, the input "sup" would match the potential accelerants "support," "supplies," and "supply room." Any identified potential accelerants may be added to the list of previously identified potential accelerants (e.g., at block 708).

At block 714, the online system determines whether at least a threshold number of potential accelerants have been identified. If so, the process may proceed to block 718, wherein the identified potential accelerants are presented to the agent.

At block 716, if the threshold number of identified potential accelerants has not been reached, in some embodiments the online system attempts to identify potential accelerants using "fuzzy" matching. As used herein, fuzzy matching may refer to the matching of words or phrases that are not identical. In some embodiments, a similarity score is calculated between the words being compared, wherein the words fuzzy match if the similarity score exceeds a threshold value. The similarity score may be based upon a length of the words being compared, a number and/or position of different letters in the words being compared, relative keyboard positions of the different letters (e.g., closer keyboard positions between different letters may result in a higher similarity score), whether one of the words being compared is a common misspelling of the other word, or any combination thereof.

In some embodiments, the language processing system first attempts to identify potential accelerants wherein the second suffix exactly matches the first prefix, while the first suffix fuzzy matches the second prefix. For example, the inputs "technical supo" or "technical sip" may match the potential accelerant "technical support" when fuzzy matching is considered. If a threshold number of potential accelerants have still not been identified, the language processing system may then attempt to identify potential accelerants where the first suffix fuzzy matches the first prefix. In some embodiments, other types of matches may also be considered (e.g., second suffix fuzzy matches first prefix, first suffix fuzzy matches second prefix).

At block 718, the language processing system displays the identified potential accelerants to the agent. In some embodiments, only the threshold number of potential accelerants are displayed. As such, if there are more than the threshold number of potential accelerants, the language processing system may rank the identified potential accelerants, and only display the highest ranking accelerants. The ranking may be based upon a "commonness score" for each accelerant indicating a general likelihood that the accelerant is to appear in a received utterance. In some embodiments, the commonness score for an accelerant is based upon a context associated with the utterance. The ranking may also be based upon a type of match with the potential accelerant (e.g., accelerants determined through exact match being given higher rank compared to accelerants determined using fuzzy match), a number of words in each accelerant, or any other attribute associated with the potential accelerants.

In some embodiments, the identified potential accelerants may also be ranked based upon a level of similarity (e.g., a phonetic or an auditory similarity) to the text of the transcription that is being replaced (if any). For example, if the agent is replacing the word "Jon" in an automatic transcription (e.g., by deleting the word "Jon" in the automatic transcription), the language processing system, when suggesting potential accelerants to the user, may be more likely to suggest "John", "Joe", or "Joan" to the agent, due to their auditory similarity to "Jon," compared to potential accelerants that are less similar to the portion of the transcription being replaced, such as "Jonathan" or "Jacob." In some embodiments, the ranking of identified potential accelerants may be based upon a combination or aggregation of different factors (e.g., commonness score, match level, similarity to text being replaced, and/or the like).

The agent, upon viewing the displayed accelerants, may accept a particular accelerant as part of the transcription, saving them from having to type the accelerant manually, or continue typing the transcription (e.g., if none of the displayed accelerants correspond to what the agent desires to type). On the other hand, if none of displayed accelerants are acceptable to the agent, the agent may ignore the displayed accelerants and continue with manual modification of the transcriptions. As the agent inputs additional information (e.g., types additional characters), the language processing system may continue to identify and display potential accelerants to the user based upon the agent input.

It is understood that while FIG. 7 illustrates a specific process and order for identifying potential accelerants (e.g., first identifying accelerants with exact matches to both suffixes, then with exact matches to one suffix, then fuzzy match), in other embodiments, different processes and orders may be used. For example, the language processing system may attempt to fuzzy match both suffixes before attempting to exact match one suffix. In some embodiments, more than two suffixes and prefixes are considered (e.g., attempting to exact match first, second, and third suffixes of a potential accelerant to the third, second, and first suffixes of the agent input).

In some embodiments, text prediction takes into account preferences of individual agents. A particular agent may have particular shorthand phrases that they wish to use when transcribing utterances (e.g., the letters "TS" used as shorthand for "technical support"). When the online system is identifying potential accelerants to be presented to the agent, if the received input from the agent matches any predefined shorthand phrases for the agent, then the corresponding phrase may be automatically included in the displayed accelerants. In some embodiments, the corresponding phrase to the predefined shorthand phrase is ranked higher in comparison to other potential accelerants identified through prefix/suffix matching, ensuring that the corresponding phrase always appears when the agent types the shorthand phrase. In some embodiments, the language processing system may maintain sets of custom shorthand mappings for each of a plurality of agents. In some embodiments, the language processing system may also maintain a set of shorthand mappings usable by multiple agents (e.g., a list of common shorthand mappings that may be suggested to all agents).

In some embodiments, potential accelerants may be identified using a language model (e.g., a language model 204). In some embodiments, the language model may be the same type of language model 204 used by ASR to automatically transcribe user utterances. In other embodiments, the language model may be different from the language model 204 used for ASR. In some embodiments, different application-specific and/or context-specific language models may be used based upon the application/context associated with the utterance.

In some embodiments, the list of possible automatic transcriptions called an N-best list can be used to generate accelerants. This list can be used as is, or can be applied to some other models or mechanisms to generate many more accelerants than just the N-best list. These other mechanisms includes but are not restricted to: acoustic/semantic/orthographic similarity, other N-best lists, use of a natural language generation system to generate related alternatives, or some vocabulary classifier (rule-based or data-driven).

In some embodiments the accelerants are generated by first performing a natural language analysis of the transcription, and then using that analysis to generate possible text suggestions.

Agent Performance Assessment

Figure 8:
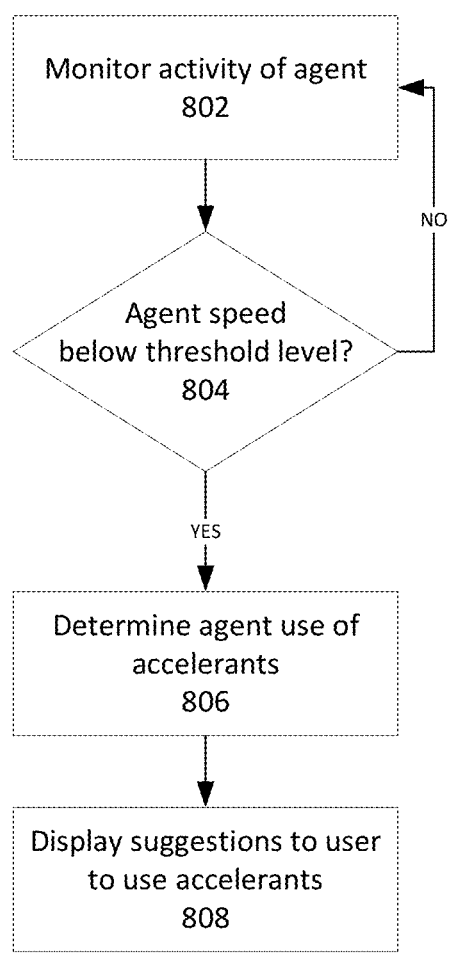
FIG. 8 is a flowchart of an example process for analyzing agent efficiency and providing suggestions to improve agent performance, in accordance with some embodiments.

FIG. 8 is a flowchart of an example process for analyzing agent efficiency and providing suggestions to improve agent performance, in accordance with some embodiments. As discussed above, transcription of user utterances may need to occur in substantially real time, thus limiting the amount of time that can be spent by agents in transcribing utterances. In some embodiments, the online system analyzes the performance of an agent, and provides the agent with suggestions to improve their performance (e.g., reduce the number of keystrokes used when transcribing an utterance through the use of accelerants).

At block 802, the language processing system monitors the activity of an agent. For example, the language processing system may monitor the agent as they transcribe a plurality of received utterances. The language processing system may track a plurality of attributes associated with the agent's activities, such as an amount of time (e.g., in seconds) used by the agent to transcribe each utterance, a length of time of each utterance, a number of keystrokes used by the agent in transcribing the utterance, any accelerants that were presented to the agent during the course of transcriptions, and/or the like. In some embodiments, the language processing system may calculate one or more aggregated attributes associated with the agent's activities (e.g., a mean amount of time used by the agent to transcribe each utterance, divided by a mean time of the transcribed utterances).

At block 804, the language processing system determines whether the agent's transcription speed is below a threshold level. The threshold level may be a predetermined threshold, set based upon the transcription speeds of one or more agents, or some combination thereof. For example, in an embodiment the threshold level corresponds to the lower a percentile of the transcription speeds of a set of monitored agent and a predetermined threshold level.

In some embodiments, the transcription speed of an agent is based upon a mean amount of time used by the agent to transcribe each received utterance (referred to as average transcription time), and a length of time associated with the corresponding utterances (referred to as average utterance time). For example, the transcription speed may be calculated as a ratio between the average transcription time and the average utterance time. In some embodiments, other attributes associated with the agent, such as average number of keystrokes used per utterance, may also be considered.

If the agent's transcription speed is above the threshold level, it may indicate that the agent is transcribing the received utterances at a desirable rate. As such, it may not be necessary to provide suggestions to improve the agent's performance. For example, even if the agent does not actively take advantage of accelerants provided to them, there may be no need to suggest to the agent to use the provided accelerants, as they are already transcribing the utterances at a desirable speed.

If the agent's transcription speed is above the threshold level, the process may return to block 802, where the agent continues to be monitored. In some embodiments, the language processing system may continuously monitor a particular agent. In other embodiments, the language processing system may monitor the agent over a predetermined period of time, over a predetermined number of received utterances, and/or at predetermined intervals. In some embodiments, the intervals between which the language processing system monitors the agent may be predetermined, or may be based upon a transcription speed of the agenda over a previous monitoring period (e.g., the higher the agent's transcription speed, the less often they may be monitored).

However, if the agent's transcription speed is below the threshold level, then the language processing system, at block 806, determines the agent's usage of accelerants. In some embodiments, the usage of accelerants, such as providing the agent an automatic transcription or by providing text prediction as the agent types, may allow for the agent to transcribe the utterance using a smaller number of keystrokes. For example, as illustrated in FIG. 6, the agent may be transcribing the utterance "I need technical support," which may be transcribed using 24 keystrokes if typed manually without the use of accelerants. If the language processing system provided an accelerant at a certain point during the transcription, such as suggesting the phrase "technical support" after the agent has typed "I need te", then the utterance may be able to be transcribed using a reduced number of keystrokes (e.g., 10 keystrokes, corresponding to the 9 characters typed by the agent and an additional keystroke to accept the displayed accelerant, instead of 24 keystrokes). Thus, by taking advantage of presented accelerants, the agent may be able to transcribe the utterance using a smaller number of keystrokes, potentially improving transcription speed.

In some embodiments, the language processing system determines a first keystroke number corresponding to a number of keystrokes actually used by the agent when transcribing an utterance, and a second keystroke number corresponding to a number of keystrokes corresponding to if the agent had taken advantage of available accelerants. If the first and second keystroke numbers differ by a threshold amount or percentage, then at block 808, the agent may be presented with a notification prompting them to take advantage of presented accelerants in order to reduce a number of keystrokes used during transcriptions.

In some embodiments, the second keystroke number is determined based upon a number of keystrokes that would be needed to transcribe an utterance if all presented accelerants that would have resulted in a correct transcription had been utilized by the agent. As used herein, a "correct transcription" refers to a transcription that would be the same as the transcription actually transcribed by the agent corresponding to the utterance. After the complete transcription of the utterance is received, the language processing system may determine which accelerants would have resulted in a correct transcription, and which would have resulted in an incorrect transcription. For example, an automatic transcription provided to the agent may contain some words or phrases that are correct, and/or some words or phrases that are incorrect. In addition, text prediction may provide predicted text that is correct or incorrect (e.g., in the above example where the agent has inputted "I need te" as part of the transcription "I need technical support," the online system may suggest "tennis racquets" which would be an incorrect accelerant, while a suggestion of "technical support" would be a correct accelerant). The language processing system may determine the second keystroke number based upon the number of keystrokes that would be needed to produce the transcription if correct accelerants were used.

The first and second keystroke numbers discussed above may serve as proxies of the agent's actual transcription speed and the agent's potential transcription speed (e.g., if the agent utilized the correct accelerants presented to them). In some embodiments, in addition to number of keystrokes, other attributes (such as distance between adjacent keys on a keyboard, measured time periods taken by the agent to perform certain keystrokes, and/or the like) are also used in determining the agent's potential transcription speed. The agent may be presented with notifications prompting them to take advantage of presented accelerants if their actual transcription speed and potential transcription speed differ by a threshold amount.

In some embodiments, the language processing system is configured to continue to provide suggestions to the agent over a predetermined number of utterances, until the transcription speed of the agent over a number of utterances meets a threshold amount. By providing suggestions to agents that do not meet a threshold transcription speed and are not taking advantage of provided accelerants (e.g., as indicated by the disparity between actual and potential transcription speeds), the agent may be encouraged or reminded to take advantage of accelerants to improve transcription speed, potentially improving performance of the language processing system by improving the ability of the online system to respond to user utterances in substantially real-time.

Computer System

Figure 9:
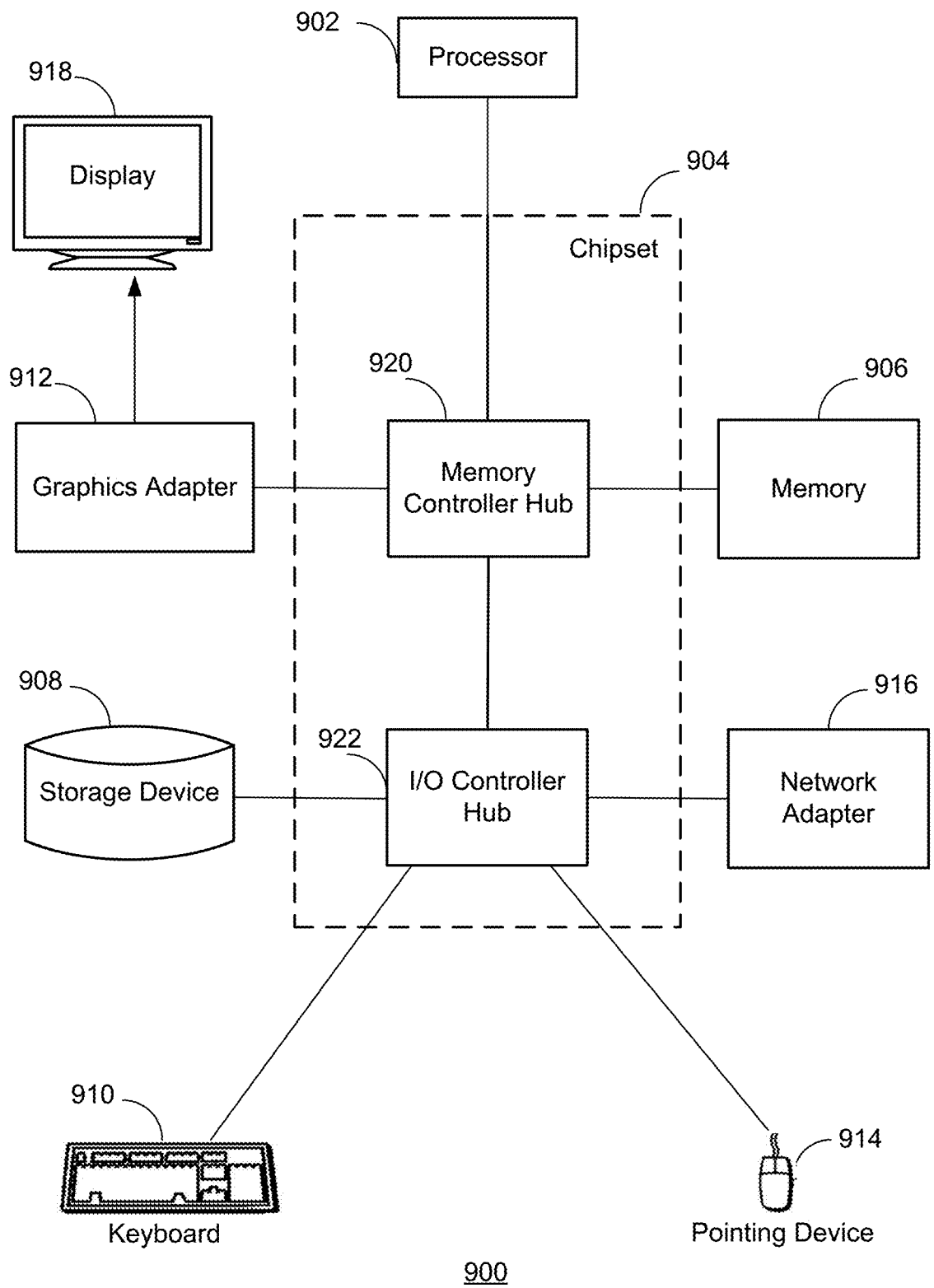
FIG. 9 is a high-level block diagram illustrating physical components of a computer used as part or all of the computing environment from FIG. 1, according to one embodiment.

FIG. 9 is a high-level block diagram illustrating physical components of a computer 900 used as part or all of the computing environment from FIG. 1, according to one embodiment. Illustrated are at least one processor 902 coupled to a chipset 904. Also coupled to the chipset 904 are a memory 906, a storage device 908, a graphics adapter 912, and a network adapter 916. A display 918 is coupled to the graphics adapter 912. In one embodiment, the functionality of the chipset 904 is provided by a memory controller hub 920 and an I/O controller hub 922. In another embodiment, the memory 906 is coupled directly to the processor 902 instead of the chipset 904.

The storage device 908 is any non-transitory computer-readable storage medium, such as a hard drive, compact disk read-only memory (CD-ROM), DVD, or a solid-state memory device. The memory 906 holds instructions and data used by the processor 902. The graphics adapter 912 displays images and other information on the display 918. The network adapter 916 couples the computer 900 to a local or wide area network.

As is known in the art, a computer 900 can have different and/or other components than those shown in FIG. 9. In addition, the computer 900 can lack certain illustrated components. In one embodiment, a computer 900 acting as a server may lack a graphics adapter 912, and/or display 918, as well as a keyboard or pointing device. Moreover, the storage device 908 can be local and/or remote from the computer 900 (such as embodied within a storage area network (SAN)).

As is known in the art, the computer 900 is adapted to execute computer program modules for providing functionality described herein. As used herein, the term "module" refers to computer program logic utilized to provide the specified functionality. Thus, a module can be implemented in hardware, firmware, and/or software. In one embodiment, program modules are stored on the storage device 908, loaded into the memory 906, and executed by the processor 902.

Embodiments of the entities described herein can include other and/or different modules than the ones described here. In addition, the functionality attributed to the modules can be performed by other or different modules in other embodiments. Moreover, this description occasionally omits the term "module" for purposes of clarity and convenience.

Other Considerations

The present invention has been described in particular detail with respect to one possible embodiment. Those of skill in the art will appreciate that the invention may be practiced in other embodiments. First, the particular naming of the components and variables, capitalization of terms, the attributes, data structures, or any other programming or structural aspect is not mandatory or significant, and the mechanisms that implement the invention or its features may have different names, formats, or protocols. Also, the particular division of functionality between the various system components described herein is merely for purposes of example, and is not mandatory; functions performed by a single system component may instead be performed by multiple components, and functions performed by multiple components may instead performed by a single component.

Some portions of above description present the features of the present invention in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

The present invention also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a non-transitory computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of computer-readable storage medium suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the art, along with equivalent variations. In addition, the present invention is not described with reference to any particular programming language. It is appreciated that a variety of programming languages may be used to implement the teachings of the present invention as described herein, and any references to specific languages are provided for invention of enablement and best mode of the present invention.

The present invention is well suited to a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

What is claimed is:

1. A computer-implemented method comprising:
receiving over a network, at an application at an application server, an utterance provided by a user of a client device in response to a prompt presented to the user by the application;
determining a context of the associated utterance indicating an interaction state between the user and the application, based at least in part upon one or more previous prompts presented to the user;
generating at least one automatic transcription of the utterance using a language model selected from a plurality of language models based upon the determined context;
generating an agent interface to be displayed to an agent at an agent terminal, the agent different from the user of the remote client device, the agent interface displaying at least the at least one automatic transcription;

receiving, from the agent, via the agent interface displayed at the agent terminal, one or more inputs indicating replacement or supplement of at least a portion of the at least one automatic transcription;

in response to receiving the one or more inputs, presenting to the agent via the agent interface one or more suggestions based upon the one or more inputs, wherein the one or more suggestions are updated as additional inputs from the agent are received; and generating an updated transcription of the utterance.

2. The method of claim 1, wherein the context is determined based upon traversal of a context model using the one or more previous prompts presented to the user.

3. The method of claim 2, wherein traversal of the context model is further based upon and one or more previous utterances received from the user responsive to presentation of the one or more previous prompts.

4. The method of claim 1, further comprising:
generating a priming string based upon the presented prompt and the determined context, the priming string describing an expected indication associated with the utterance to aid an agent in transcribing the utterance; and
wherein the agent interface further displays the generated priming string.

5. The method of claim 4, wherein the priming string describes an expected text type associated with the utterance.

6. The method of claim 4, wherein the generated priming string is different from a second priming string generated based upon a same prompt presented to a second user of the application associated with a different context.

7. The method of claim 1, wherein the language model is selected from the plurality of language models comprising:
determining whether the plurality of language models comprises a language model specific to the identified context and the application;
responsive to determining that the plurality of language models does not comprise a language model specific to the identified context and application, selecting a language model of the plurality of language models corresponding to the application.

8. The method of claim 1, further comprising updating the selected language model based upon the updated transcription.

9. The method of claim 1, wherein the one or more inputs comprises a piece of text for replacing or supplementing the portion of the automatic transcription.

10. The method of claim 9, wherein the one or more suggestions are selected such that at least a portion of each of the one or more suggestions matches the piece of text.

11. The method of claim 1, wherein the one or more suggestions are generated using a second language model selected based upon the determined context.

12. The method of claim 1, further comprising:
determining an agent speed based upon a number of actions taken by the agent to generate the updated transcription;
determining a potential speed based upon a potential number of actions needed to generate the updated transcription using the one or more suggestions;
responsive to the agent speed and the potential speed differing by at least a threshold amount, generating a notification for display to the agent at the agent terminal.

13. A language processing system comprising a processor and a memory in communication with the processor, the memory storing programming instructions executable by the processor to:
receive over a network, at an application at an application server, an utterance provided by a user of a client device in response to a prompt presented to the user by the application;
determine a context of the associated utterance indicating an interaction state between the user and the application, based at least in part upon one or more previous prompts presented to the user;
generate at least one automatic transcription of the utterance using a language model selected from a plurality of language models based upon the determined context;
generate an agent interface to be displayed to an agent at an agent terminal, the agent different from the user of the remote client device, the agent interface displaying at least the at least one automatic transcription;
receive, from the agent, via the agent interface displayed at the agent terminal, one or more inputs indicating replacement or supplement of at least a portion of the at least one automatic transcription;
in response to receiving the one or more inputs, present to the agent via the agent interface one or more suggestions based upon the one or more inputs, wherein the one or more suggestions are updated as additional inputs from the agent are received; and
generate an updated transcription of the utterance.

14. The language processing system of claim 13, wherein the context is determined based upon traversal of a context model using the one or more previous prompts presented to the user.

15. The language processing system of claim 13, wherein the programming instructions are further executable by the processor to:
generating a priming string based upon the presented prompt and the determined context, the priming string describing an expected indication associated with the utterance to aid an agent in transcribing the utterance; and
wherein the agent interface further displays the generated priming string.

16. The language processing system of claim 15, wherein the generated priming string is different from a second priming string generated based upon a same prompt presented to a second user of the application associated with a different context.

17. The language processing system of claim 13, wherein the language model is selected from the plurality of language models comprising:
determining whether the plurality of language models comprises a language model specific to the identified context and the application;
responsive to determining that the plurality of language models does not comprise a language model specific to the identified context and application, selecting a language model of the plurality of language models corresponding to the application.

18. The language processing system of claim 13, wherein the one or more inputs comprises a piece of text for replacing or supplementing the portion of the automatic transcription, and the one or more suggestions are selected such that at least a portion of each of the one or more suggestions matches the piece of text.

19. The language processing system of claim 13, wherein the one or more suggestions are generated using a second language model selected based upon the determined context.

20. The language processing system of claim 13, wherein the programming instructions are further executable by the processor to:
- determine an agent speed based upon a number of actions taken by the agent to generate the updated transcription;
- determine a potential speed based upon a potential number of actions needed to generate the updated transcription using the one or more suggestions;
- responsive to the agent speed and the potential speed differing by at least a threshold amount, generate a notification for display to the agent at the agent terminal.

* * * * *